United States Patent
Yahata et al.

(10) Patent No.: US 8,078,392 B2
(45) Date of Patent: Dec. 13, 2011

(54) UNBURNED FUEL AMOUNT-ESTIMATING DEVICE IN ENGINE AND TEMPERATURE-ESTIMATING DEVICE OF EXHAUST EMISSION PURIFIER

(75) Inventors: Shigeto Yahata, Obu (JP); Shinichirou Okugawa, Toyota (JP); Tsutomu Soga, Kariya (JP)

(73) Assignee: Denso Corporation, Kariya (JP)

( * ) Notice: Subject to any disclaimer, the term of this patent is extended or adjusted under 35 U.S.C. 154(b) by 1119 days.

(21) Appl. No.: 11/826,427

(22) Filed: Jul. 16, 2007

(65) Prior Publication Data
US 2008/0040014 A1 Feb. 14, 2008

(30) Foreign Application Priority Data

Aug. 9, 2006 (JP) ................. 2006-216535

(51) Int. Cl.
*G06F 19/00* (2011.01)
*G06G 7/70* (2006.01)
*G06G 7/76* (2006.01)

(52) U.S. Cl. .......... 701/123; 701/86; 701/101; 701/103; 701/104; 701/112

(58) Field of Classification Search ............. 701/86, 701/103, 104, 112, 123, 101; 60/288, 297, 60/295, 311, 776, 790, 800
See application file for complete search history.

(56) References Cited

U.S. PATENT DOCUMENTS

| | | | | |
|---|---|---|---|---|
| 7,302,933 B2* | 12/2007 | Kerns | | 123/431 |
| 7,357,101 B2* | 4/2008 | Boyarski | | 123/1 A |
| 7,395,786 B2* | 7/2008 | Leone et al. | | 123/1 A |
| 7,406,947 B2* | 8/2008 | Lewis et al. | | 123/478 |
| 7,640,912 B2* | 1/2010 | Lewis et al. | | 123/304 |
| 2004/0139738 A1* | 7/2004 | Kuboshima et al. | | 60/288 |
| 2005/0060990 A1* | 3/2005 | Ueno et al. | | 60/295 |
| 2007/0119392 A1* | 5/2007 | Leone et al. | | 123/25 C |
| 2007/0119394 A1* | 5/2007 | Leone | | 123/25 R |
| 2007/0119410 A1* | 5/2007 | Leone et al. | | 123/295 |

(Continued)

FOREIGN PATENT DOCUMENTS

JP 07-317528 12/1995

(Continued)

OTHER PUBLICATIONS

Japanese Office Action dated May 11, 2010, issued in corresponding Japanese Application No. 2006-216535, with English translation.

*Primary Examiner* — Khoi Tran
*Assistant Examiner* — Jorge Peche
(74) *Attorney, Agent, or Firm* — Nixon & Vanderhye P.C.

(57) ABSTRACT

There is provided with an ECU for estimating an unburned fuel amount (HC) emitted from an engine after fuel combustion or a temperature of a DPF based upon a required engine operating condition as a control target value. An exhaust gas temperature sensor for detecting a temperature of an exhaust gas emitted directly from the engine is provided. A program for compensating for an estimation error in regard to an estimation value of the unburned fuel amount estimated from the required engine operating condition, that is, an operating condition difference amount between the required engine operating condition and an actual engine operating condition, based upon an engine exhaust gas temperature detected from the exhaust gas temperature sensor is provided.

16 Claims, 10 Drawing Sheets

U.S. PATENT DOCUMENTS

| | | | |
|---|---|---|---|
| 2007/0119411 A1* | 5/2007 | Kerns | 123/295 |
| 2007/0119412 A1* | 5/2007 | Leone et al. | 123/295 |
| 2007/0119413 A1* | 5/2007 | Lewis et al. | 123/295 |
| 2007/0119414 A1* | 5/2007 | Leone et al. | 123/295 |
| 2007/0119415 A1* | 5/2007 | Lewis et al. | 123/295 |
| 2007/0119416 A1* | 5/2007 | Boyarski | 123/304 |
| 2007/0119420 A1* | 5/2007 | Leone et al. | 123/431 |
| 2007/0119421 A1* | 5/2007 | Lewis et al. | 123/431 |
| 2007/0119422 A1* | 5/2007 | Lewis et al. | 123/431 |
| 2007/0119424 A1* | 5/2007 | Leone et al. | 123/461 |

FOREIGN PATENT DOCUMENTS

| | | |
|---|---|---|
| JP | 2003-254038 | 9/2003 |
| JP | 2004-197716 | 7/2004 |
| JP | 2005-083350 | 3/2005 |
| JP | 2005-171798 | 6/2005 |

* cited by examiner

UNBURNED FUEL AMOUNT-ESTIMATING DEVICE IN ENGINE AND TEMPERATURE-ESTIMATING DEVICE OF EXHAUST EMISSION PURIFIER

CROSS REFERENCE TO RELATED APPLICATION

This application is based on Japanese Patent Application No. 2006-216535 filed on Aug. 9, 2006, the disclosure of which is incorporated herein by reference.

FIELD OF THE INVENTION

The present invention relates to a device for estimating an unburned fuel amount emitted from an engine after fuel combustion or a temperature of an exhaust emission purifier. In an engine control system for controlling an operating condition of the engine based upon a required engine operating condition as a control target value, the present invention relates to an unburned fuel amount-estimating device which estimates an unburned fuel amount emitted from the engine after fuel combustion and a temperature-estimating device of an exhaust emission purifier which estimates a temperature of an exhaust emission purifier based upon the required engine operating condition.

BACKGROUND OF THE INVENTION

For example, JP-2003-254038A discloses this type of device. In an engine control system using a diesel engine with a diesel particulate filter (hereinafter referred to as "DPF") as a PM removal filter, the device is adapted to estimate an unburned fuel amount or a DPF temperature for an engine based upon a required engine operating condition at the time of controlling an engine operating condition. More specially, this device is structured to have a map for defining a heat quantity corresponding to an unburned fuel amount and a DPF generating in a required engine operating condition sectioned by an engine rotational speed and an in-cylinder fuel injection quantity per one intake stroke for each required engine operating condition. In an actual engine operating, this device is adapted to determine the unburned fuel amount and the DPF temperature based upon an actual required engine operating condition by referring to this map.

However, in such engine control system, a required engine operation condition is not necessarily the same as an actual engine operating condition. For example, the engine control system includes some individual differences between cylinders in a multi-cylinder engine or individual differences in characteristic of control components between engines themselves. Further, in this engine control system, characteristic changes due to aging of control components. More specially in an injection quantity of an injector, there is generated a deviation (an injection quantity difference) between an injection quantity command value (required injection quantity) as a control target value and an actually injected fuel quantity due to individual differences or aging changes. In this case, the aforementioned device includes differences generated between a required engine operating condition and an actual engine operating condition, thereby resulting in generating more than a small estimation error in regard to the unburned fuel amount or the DPF temperature estimated based upon the required engine operating condition. Further, when an estimation error of the DPF temperature is great at the time of heating DPF (for example, at the time of burning PM trapped in the DPF as regeneration processing), the DPF may be damaged (melting damage) caused by excessive rise in temperature of the DPF.

In view of the above, there exists a need for an unburned fuel amount-estimating device for an engine and a temperature-estimating device of an exhaust emission purifier which overcome the above mentioned problems in the conventional art. The present invention addresses this need in the conventional art as well as other needs, which will become apparent to those skilled in the art from this disclosure.

SUMMARY OF THE INVENTION

It is an object of the present invention to provide an unburned fuel amount-estimating device in an engine and a temperature-estimating device of an exhaust emission purifier which can estimate an unburned fuel amount emitted from an engine after fuel combustion and a temperature of an exhaust emission purifier including a DPF with higher precision.

According to a first aspect of the present invention, an engine control system for controlling an operating condition of an engine based upon a required engine operating condition as a control target value is provided with an unburned fuel amount-estimating device in an engine for estimating an unburned fuel amount emitted from the engine after fuel combustion based upon the required engine operating condition. The unburned fuel amount-estimating device comprises detecting means for detecting a combustion energy equivalent value indicating a magnitude of energy generated by the fuel combustion in the engine. It further comprises compensating means for compensating for an operating condition difference amount between the required engine operating condition and an actual engine operating condition in regard to an estimation value of the unburned fuel amount, based upon at least one of fuel energy equivalent values detected by the combustion energy detecting means.

According to a second aspect of the present invention, an engine control system for controlling an operating condition of an engine based upon a required engine operating condition as a control target value is provided with a temperature-estimating device of an exhaust emission purifier for estimating a temperature of the exhaust emission purifier changing with an unburned fuel amount emitted from the engine after fuel combustion, based upon the required engine operating condition. The temperature-estimating device of the exhaust emission purifier comprises detecting means for detecting a combustion energy equivalent value indicating a magnitude of energy generated by the fuel combustion in the engine. It further comprises compensating means for compensating for an operating condition difference amount between the required engine operating condition and an actual engine operating condition in regard to a temperature estimation value of the exhaust emission purifier, based upon at least one of fuel energy equivalent values detected by the combustion energy detecting means.

An engine, as well known, generates output power (energy) by burning fuel in a cylinder. Accordingly, as shown in FIG. 15, as a combustion amount in the cylinder is greater, in other words, as the energy generated by fuel combustion is greater, an unburned fuel amount (combustible constituent amount) as unburned residuals of the fuel is reduced. The present inventor has focused attention on this respect and has obtained the recognition of a strong correlation between this combustion energy equivalent value and the actual engine operating condition to obtain the aforementioned device for compensating for the operating condition difference amount based upon the combustion energy equivalent value. According to the first or second aspect of the present invention, even if various operating condition differences including the above-mentioned injection quantity difference occur, the compensating means compensates for the difference amount, thus resulting in estimating the unburned fuel amount of the engine or the temperature of the exhaust emission purifier including the DPF with high precision. In addition, by not using one combustion energy equivalent value, but more combustion energy equivalent values, it is possible to estimate the unburned fuel amount of the engine or the temperature of the exhaust emission purifier with higher precision.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF EMBODIMENTS

First Embodiment

An unburned fuel amount-estimating device in an engine and a temperature-estimating device of an exhaust emission purifier in a first embodiment of the present invention will be explained with reference to accompanying drawings. It should be noted that each device in the present embodiment is provided in an engine control system for controlling an operating condition of an engine based upon a required engine operating condition as a control target value in the same way as the device described in JP-2003-254038A. Each device is adapted to estimate an unburned fuel amount of the engine and a temperature of the exhaust emission purifier based upon the required engine operating condition in the engine control system. Particularly, in the present embodiment, this device is mounted in a common rail type of fuel injection control system for a vehicular diesel engine (internal combustion engine).

First, the structure of this system will be described with reference to FIG. 1.

Figure 1:
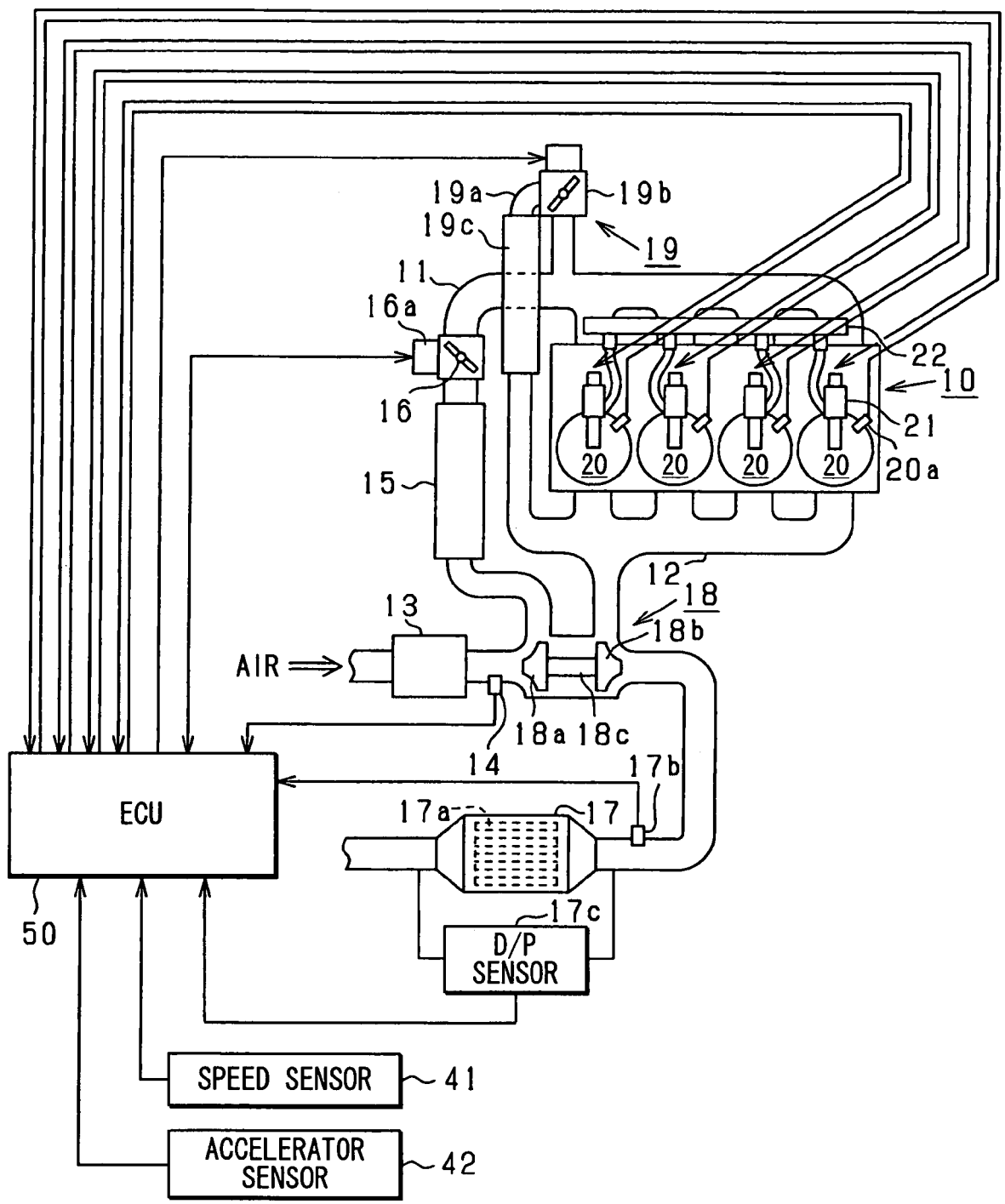
FIG. 1 is a schematic structural diagram showing an engine control system to which an unburned fuel amount-estimating device and a temperature-estimating device of an exhaust emission purifier in a first embodiment of the present invention are applied.

FIG. 1 is a schematic structural diagram of a vehicular control system mounted in each device in the present embodiment.

As shown in FIG. 1, the engine control system is structured to use a reciprocal type diesel engine of a four-cylinder diesel engine 10 equipped with a common rail type fuel injection device as a control object and include various sensors and an ECU (electronic control unit) 50 for controlling the engine 10.

The engine 10 is structured in such a manner to accommodate pistons (not shown) in four cylinders respectively and reciprocates the piston in the cylinder 20 based upon energy generated by fuel combustion in a combustion chamber in the cylinder 20. A reciprocal movement of each piston causes rotation of a crankshaft as an output shaft (not shown) disposed to each piston. An intake pipe 11 and an exhaust pipe 12 (exhaust passage) are disposed in each combustion chamber in the cylinders 20 so as to open in each combustion chamber and each opening of the intake pipe 11 and the exhaust pipe 12 is opened/closed by an intake valve and an exhaust valve driven by a camshaft (not shown).

An air flow meter 14 is disposed in the intake pipe 11 for detecting a fresh air amount aspired through an air cleaner 13 at the most upstream portion of the intake pipe 11. An intercooler 15 for cooling intake air is disposed downstream of the air flow meter 14. Further, an electrically controlled throttle valve 16 of which an opening degree is electronically adjusted by an actuator such as a DC motor and a throttle opening sensor 16a for detecting an opening and a movement (opening fluctuation) of the throttle valve 16 are disposed downstream of the intercooler 15.

On the other hand, a DPF (Diesel Particulate Matter) 17 for trapping PM (Particulate Matter) in the exhaust gas is disposed in the exhaust pipe 12 as an exhaust emission purifier. An exhaust gas temperature sensor 17b for detecting an exhaust gas temperature is disposed upstream of the DPF 17 and a temperature (core temperature) of the DPF 17 can be detected based upon a detection value of the exhaust gas temperature sensor 17b and an unburned fuel amount of the engine (mainly HC content) estimated by the unburned fuel amount-estimating device.

Here, the DPF 17 is formed of a cylindrical, porous partition structure made of heat resistance ceramics such as cordierite in which oxidized catalysts composed of Pt or the like are carried (in detail, coated in partition walls) by filter bases 17a (monolithic carrier) of wall flow type where honeycomb shaped holes are alternately closed. In consequence, when exhaust gases from the engine 10 pass through porous partitions in the DPF 17 (filter base 17a), the PM in the exhaust gas is trapped in the DPF 17. Regular execution of the burning processing (or irregular execution in response to a PM trap amount) burns the PM trapped in the DPF 17 and the burned PM is discharged as nontoxic carbon dioxide gases. In addition, since the DPF 17 carries the oxidized catalyst, HC or CO together with a soluble organic constituent (SOF) which is one of PM constituents can be removed.

Further, a differential pressure sensor 17c is disposed in the exhaust pipe 12 equipped with the DPF 17 for detecting a differential pressure between a pressure in close proximity to an inlet of the DPF 17 and a pressure in close proximity to an outlet thereof. The differential pressure detected by the differential pressure sensor 17c is equivalent to a pressure loss by the DPF 17 and is to indicate degrees of clogging in the DPF 17 caused by PM trapping. Therefore, for example, by referring to a certain map (for example, map defining a relation between the differential pressure between the DPF inlet and outlet in advance measured by experiments or the like and the PM trapping amount), an amount of the PM trapped by the DPF 17 (PM trapping amount) can be calculated.

On the other hand, an injector 21 as an electromagnetic driven fuel injection valve and an in-cylinder pressure sensor 20a are further disposed in the combustion chamber in each cylinder 20. The injector 21 injects and supplies fuel (diesel oil) for combustion in the combustion chamber and the in-cylinder pressure sensor 20a detects a pressure (in-cylinder pressure) in the combustion chamber. In addition, these injectors 21 are connected to a common rail 22 as a pressure accumulation pipe through a high-pressure fuel pipe and high-pressure fuel is sequentially supplied to the common rail 22 to accumulate the high pressure which is equivalent to the injection pressure. In the engine 10, a required amount of fuel is supplied to each cylinder 20 by opening the injector 21 as needed. That is, at the operating of the engine 10, intake air is introduced from the intake pipe 11 into the combustion chamber of the cylinder 20 caused by an opening motion of the intake valve. The introduced intake air is mixed with fuel injected and supplied from the injector 21 and a mixture of the intake air and the fuel is compressed by the piston in the cylinder 20 for ignition (self ignition) and is burned, and the exhaust gas after combustion is discharged into the exhaust pipe 12 by an opening motion of the exhaust valve. Since in such a common rail system, an ECU 50 for engine control performs control for a fuel system, fuel can be basically supplied in a required injection quantity and a required injection pressure at required timing without an influence of an engine operating condition (for example, rotational speed, engine load or the like).

Further, in this system, a turbocharger 18 is disposed between the intake pipe 11 and the exhaust pipe 12. The turbocharger 18 includes an intake compressor 18a disposed in the intake pipe 11 (between the air flow meter 14 and the intercooler 15) and an exhaust turbine 18b disposed in the midst of the exhaust pipe 12 (upstream of the DPF 17) and the compressor 18a and the turbine 18b are connected by a shaft 18c. That is, the exhaust turbine 18b is rotated by the exhaust gas flowing in the exhaust pipe 12 and the rotational force is transmitted to the intake compressor 18a through the shaft 18c. The air flowing in the intake pipe 11 is compressed by the intake compressor 18a to be supercharged. Further, at this point, the supercharged air is cooled by the intercooler 15, leading to an increase on filling efficiency of the intake air.

In addition, an EGR device 19 for recirculating a part of exhaust gases to an intake system as an EGR (Exhaust Gas Recirculation) gas is also disposed between the intake pipe 11 and the exhaust pipe 12. The EGR device 19 is basically formed of an EGR pipe 19a connecting between the intake pipe 11 and the exhaust pipe 12, an EGR valve 19b composed of an electromagnetic valve or the like for adjusting a passage area of the EGR pipe 19a by a valve opening degree thereof and an EGR cooler 19c for cooling the EGR gas flowing in the pipe. The EGR device 19 recirculates a part of the exhaust gases to the intake system through the EGR pipe 19a based upon such structure to reduce a combustion temperature, thereby reducing generation of NOx.

In addition, in a vehicle (not shown), besides the above-mentioned sensors various sensors for vehicle control are further disposed. For example, the vehicle is provided with a rotational speed sensor 41 composed of a crank angle sensor (main rotational speed sensor) for detecting an engine rotational speed, a cylinder identifying sensor (sub rotational speed sensor) and the like, an accelerator positioning sensor 42 for detecting a depressed amount (accelerator pedal position) of an accelerator pedal by a driver and the like.

An ECU 50 is provided with a known microcomputer (not shown) and operates various actuators such as the injector 21 in a desired mode based upon detection values of various sensors for detecting an operating condition of the engine 10 and a user's request. Thereby, various controls relating to the engine 10 are performed. The microcomputer mounted in the ECU 50 is basically formed of various calculation devices and memory devices such as a CPU (central processing unit) for performing various calculations, a RAM (Random Access Memory) as a main memory, a ROM (memory unit exclusive for reading-out) as a program memory, and an EEPROM as a data preservation memory (electrically rewritable nonvolatile memory). Further, various programs and control maps relating to the engine control including programs in regard to estimation of an unburned fuel amount of the engine and the DPF temperature are in advance stored in the ROM and various control data including design data of the engine 10 are in advance stored in the data preservation memory (EEPROM).

Next, an operation of this system will be explained hereinafter.

In the engine control system, by performing the calculations and the various programs by the ECU 50, a required engine operating condition as a control target value is sequentially calculated for obtaining an optimal operating condition of the engine 10. More specifically a fuel injection pattern, a fuel injection quantity, injection timing, an injection pressure, ignition timing, an EGR amount and the like in accordance with an operating condition of the engine 10 are sequentially calculated based upon various conditions including a required torque value and an engine rotational speed. The required torque value is sequentially calculated based upon an accelerator pedal position, an engine rotational speed and the like. In addition, for realizing the then-required engine operating condition, feedback control is performed to various actuators of the engine 10 respectively, so that the required engine operating condition and the actual engine operating condition are the same. In the present embodiment, assuming a case where as one example of a highly practical structure, the present invention is applied to an engine control of a generally used diesel engine, an air-fuel ratio is not feedback-controlled and is set to a lean air-fuel ratio all the time. Accordingly, a torque value of the engine 10 is basically controlled only by a fuel injection quantity.

Thus the aforementioned system is adapted to perform the control in such a manner that the required engine operating condition is brought to be equal to the actual engine operating condition. The Unburned fuel amount-estimating device in the present embodiment is to estimate an unburned fuel amount (mainly HC content) emitted from the engine 10 after fuel combustion based upon the required engine operating condition. However, in fact, as described above, the required engine operating condition is not necessarily equal to the actual engine operation condition due to individual differences or aging changes of the above various control components. In addition, as described above, an estimation error occurs in the unburned fuel amount estimated based upon the required engine operating condition, caused by the deviation of the operating condition. Therefore, the present embodiment is adapted to detect a magnitude of energy generated by fuel combustion in the engine 10 (combustion energy) to compensate for the estimation error (operating condition difference amount) due to the deviation of the above operating condition, based upon the detected magnitude. More specifically the exhaust gas temperature sensor 17b (refer to FIG. 1) detects the magnitude of the combustion energy as an exhaust gas temperature (combustion energy equivalent value).

Referring to FIGS. 2 to 5, a compensation mode of the operating condition difference amount will be further explained. It should be noted that in particular a case of estimating an unburned fuel amount generated at regeneration processing of the DPF 17 will be described.

Figure 2:
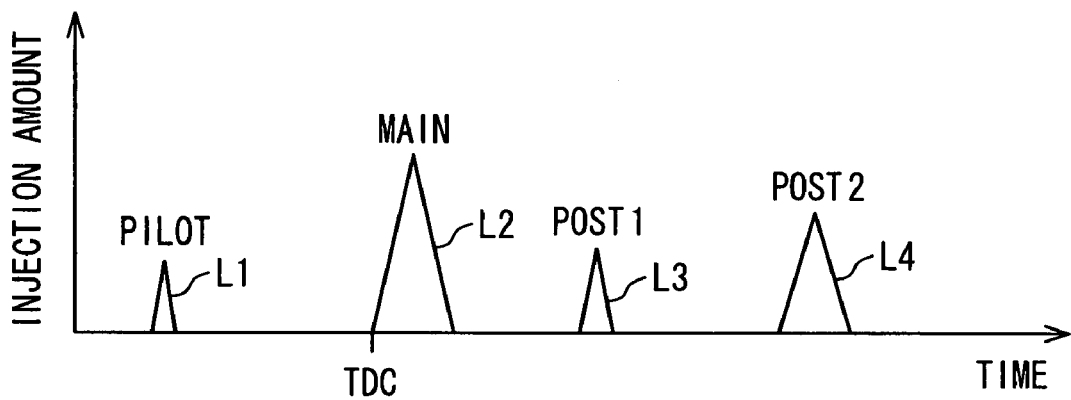
FIG. 2 is a timing chart showing one mode of a fuel injection pattern at DPF regeneration.

Referring to FIG. 2, a DPF regeneration processing is explained. As described above, in a diesel engine, combustion control (particularly torque control) is performed mainly by controlling a fuel quantity, and the throttle valve 16 is usually held in a constant opening degree (for example, substantially fully opened state). However, in a case where regeneration of the DPF 17 is required, an opening of the throttle valve 16 is properly controlled for adjusting an exhaust gas temperature or the like.

For example, FIG. 2 is a timing chart showing one mode of a fuel injection pattern at DPF regeneration processing. As shown in FIG. 2, this example performs regeneration processing of the DPF 17 by performing plural fuel injections for one combustion (multiple injection). That is, first, a small amount of fuel is injected as pilot injection (injection configuration L1) to promote a mixture of fuel and air immediately before ignition and also to reduce a delay of ignition timing, controlling NOx generation or reducing combustion noises and vibration. Then, after this pilot injection, main injection (injection configuration L2) for output torque generation is performed in close proximity to a top dead center (TDC). Further, at timing delayed in a predetermined time from the main injection, two post injections (injection configurations L3 and L4) are performed by an interval to the extent of connecting between combustions. Thereby, the exhaust gas temperature is increased and also the unburned fuel (mainly HC) is added to the oxidized catalyst of the DPF 17 to burn the trapped PM, finally perform regeneration of the DPF 17. It should be noted that a fuel injection pattern is not limited to such fuel injection pattern, and an optimal fuel injection pattern is set based upon a required torque value, an engine rotational speed, a DPF trap PM amount, a DPF temperature and the like at this point.

Next, by referring to FIGS. 3 to 5, an estimation mode in regard to an amount of unburned fuel (an unburned fuel amount of an engine) generated at regeneration processing will be explained.

Figure 3:
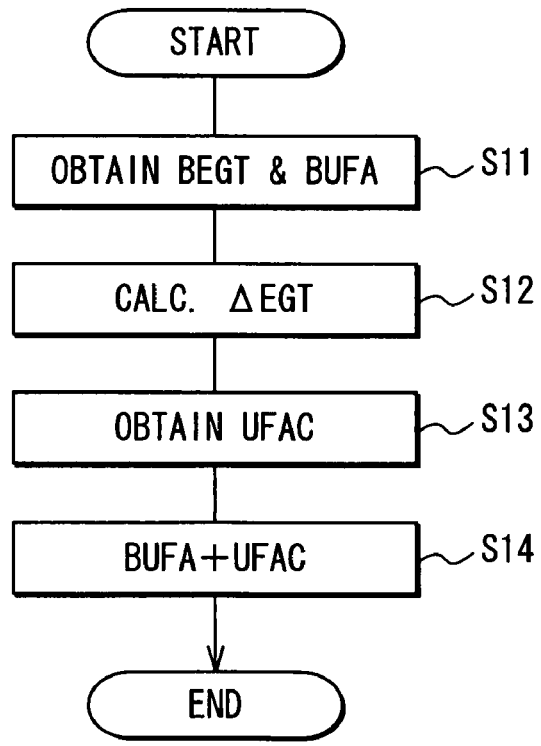
FIG. 3 is a flowchart showing a process in regard to an estimation of an unburned fuel amount executed by the device in the first embodiment.

FIG. 3 is a flowchart showing a process in regard to estimation of an unburned fuel amount executed by the ECU 50 in the present embodiment. A series of processes in FIG. 3 are basically executed at each predetermined crank angle or a predetermined time cycle sequentially in regard to each cylinder 20 of the engine 10 at least at regeneration processing of the DPF 17 by performing programs stored in the ROM by the ECU 50. Values of various parameters used in the process in FIG. 3 are stored in a memory device such as a RAM or an EEPROM mounted in the ECU 50 as needed and are updated when necessary.

As shown in FIG. 3, at step S11, for example, by referring to a certain map, a predetermined basic engine exhaust gas temperature BEGT and a basic engine unburned fuel amount BUFA (equivalent to an estimation value of an unburned fuel amount) in accordance with a required engine operating condition at this point are obtained as basic values before correction. FIG. 4 shows on e example of a map used for obtaining these basic values.

Figure 4:
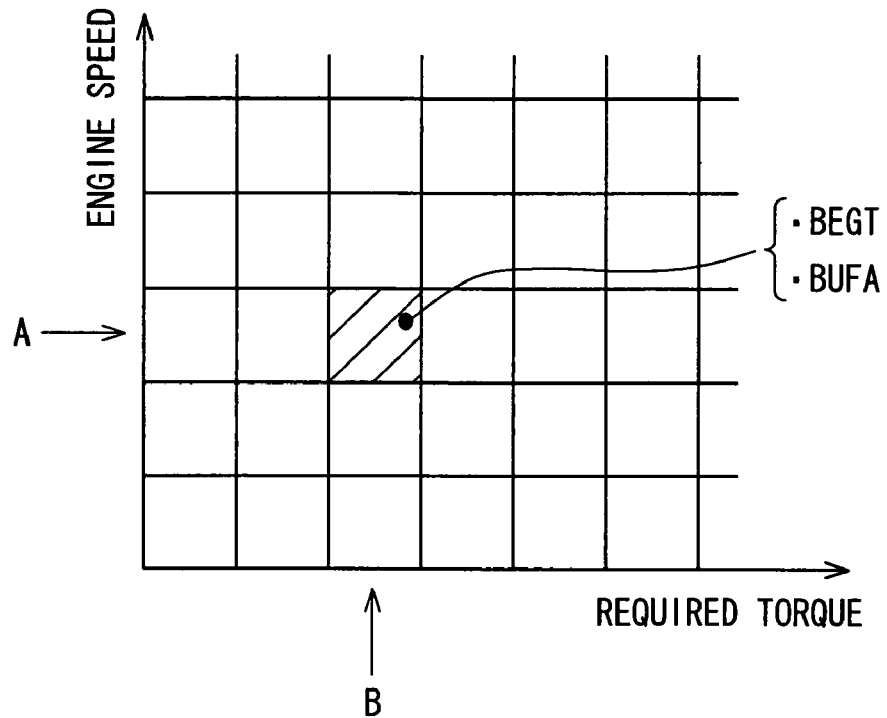
FIG. 4 is a map used upon obtaining a basic value in the first embodiment.

As shown in FIG. 4, this map is, when each value of an engine rotational speed and a required engine operating condition is defined, a two dimensional map where the respective basic values corresponding to this, that is, the basic engine exhaust gas temperature BEGT and the basic engine unburned fuel amount BUFA are defined uniquely. This map is made by in advance obtaining associated relations between parameters by experiments or the like, for example. That is, when an engine rotational speed is denoted by "A" and a required torque value is denoted by "B", values in the part hatched by oblique lines in FIG. 4 are obtained as the respective basic values BEGT and BUFA.

Next, at step S12, a differential exhaust gas temperature ΔEGT between an actual engine exhaust gas temperature detected as a temperature of exhaust gases (engine exhaust gas) emitted directly from the engine 10 by the exhaust gas temperature sensor 17b and the basic engine exhaust gas temperature BEGT obtained at step S11 (=actual engine exhaust gas temperature−basic engine exhaust gas temperature BEGT) is calculated.

At next step S13, an engine unburned fuel amount correction value UFAC is obtained based upon this differential temperature ΔEGT and a specified map. This correction value UFAC is used for compensating for an estimation error (operating condition difference amount) of an unburned fuel amount due to the deviation of the aforementioned operating condition in regard to the basic engine unburned fuel amount BUFA obtained at former step S11. FIG. 5 shows a map used for obtaining this correction value.

Figure 5:
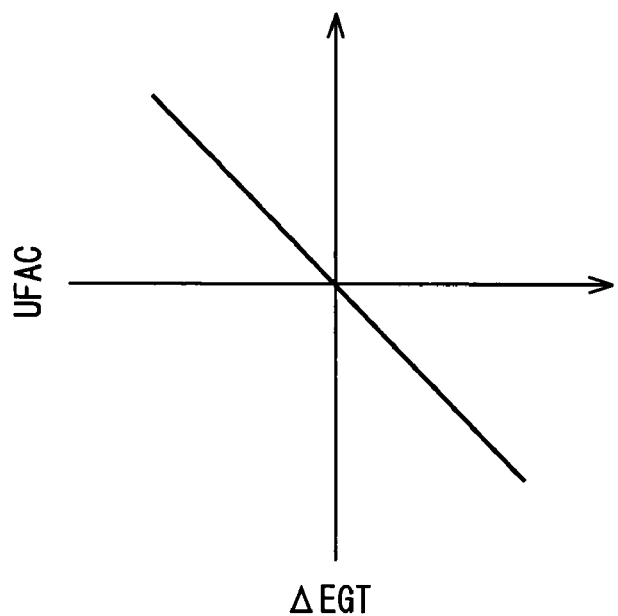
FIG. 5 is a map used upon obtaining a correction value in the first embodiment.
Figure 15:
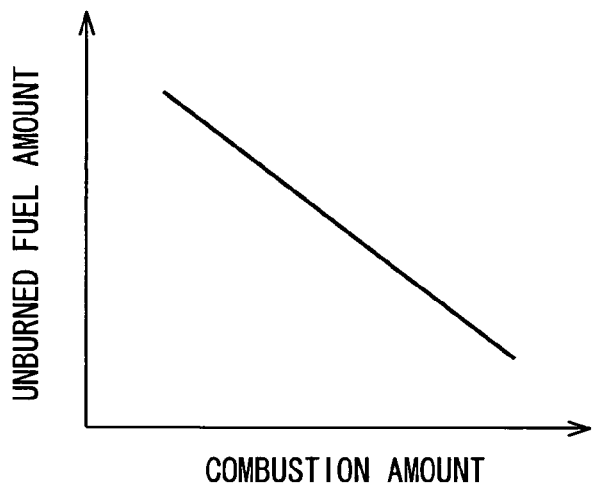
FIG. 15 is a graph showing a relation between a combustion amount and an unburned fuel amount in a cylinder.

As shown in FIG. 5, this map is a one-dimensional map in which an engine unburned fuel amount correction value UFAC is defined by the differential temperature ΔEGT uniquely, and is made by in advance obtaining an associated relation between the engine unburned fuel amount correction value UFAC and the differential temperature ΔEGT by experiments or the like, for example. In detail, according to a relation between the combustion energy (combustion amount) shown in FIG. 15 and the unburned fuel amount, as the combustion energy (exactly, differential temperature ΔEGT which is a combustion energy equivalent value) becomes greater, a correction value for increasing a correction amount to the unburned fuel amount estimation value obtained at former step S11 in a minus side (in the direction of reduction) is to be obtained.

The engine unburned fuel amount correction value UFAC is thus obtained and at next step S14, for example, calculation of "basic engine unburned fuel amount BUFA+the engine unburned fuel amount correction value UFAC" is made. This calculation compensates for the operating condition difference amount of the basic engine unburned fuel amount obtained at step S11. In consequence, the unburned fuel amount of the engine 10 is to be estimated with high precision.

Further, a calculation of "a detection value (detection temperature) of the exhaust gas temperature sensor 17b+a temperature rise amount due to catalyst reaction of the unburned fuel amount" is made to obtain a temperature of the DPF 17. It should be noted that the temperature rise amount due to catalyst reaction of the unburned fuel amount can be easily obtained by using a map or the like. For example, the following structure is advantageous. An associated relation between the temperature rise amount due to the catalyst reaction and the unburned fuel amount (basically, as the unburned fuel amount becomes greater, the temperature rise amount also increases) is in advance obtained by experiments or the like. Then, a map is made by this associated relation and is held in the ECU 50. By this structure, the temperature rise amount due to the unburned fuel amount can be easily determined by the unburned fuel amount obtained through a series of the processes in FIG. 3.

Figure 6:
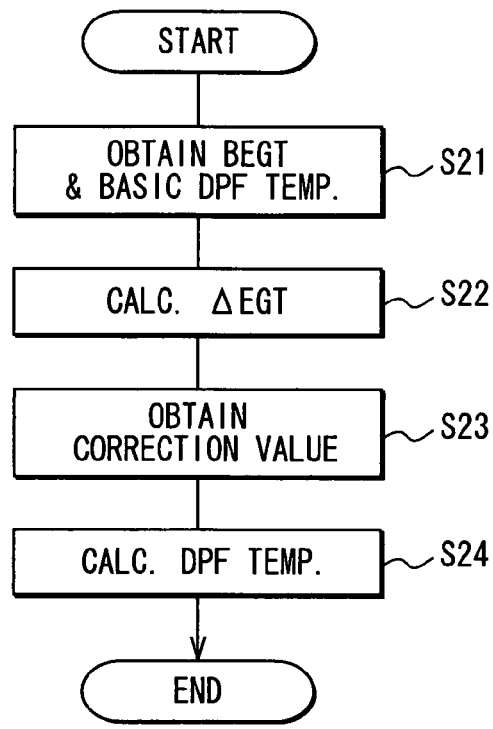
FIG. 6 is a flowchart showing a modification of a DPF temperature estimating mode.

In a case of not using the unburned fuel amount obtained through a series of the processes in an application other than the DPF temperature estimation, for example, as shown in FIG. 6, the unburned fuel amount itself may not be calculated to estimate the DPF temperature only. Hereinafter, this structure will be further explained with reference to FIG. 6. The processes at steps S21 to 24 in FIG. 6 basically correspond to those at steps S11 to S14 in FIG. 3 described above and the detailed explanation thereof is omitted.

First, at step S21, the aforementioned basic engine exhaust gas temperature BEGT and the basic DPF temperature are obtained as basic values before correction and at subsequent step S22, the differential temperature ΔEGT described above is obtained. Further, at subsequent step S23, a DPF temperature correction value is calculated based upon the differential temperature ΔEGT. Thereby, at step S24, the operating condition difference amount in regard to the basic DPF temperature (DPF temperature estimation value) obtained at first step S21 is compensated based upon the DPF temperature correction value. With this structure, the estimation error of the DPF temperature can be compensated without calculating the unburned fuel amount itself. Here, the DPF temperature correction value is made by converting the unburned fuel amount into the DPF temperature and is substantially the same as the engine unburned fuel amount correction value UFAC. In addition, the basic DPF temperature corresponds to the DPF temperature correction value and is set as a temperature conversion value.

According to the present embodiment described above in detail, the following excellent advantage can be obtained.

(1) The present embodiment is structured to be provided with an exhaust gas temperature sensor 17b for detecting a temperature of exhaust gases (combustion energy equivalent value) emitted directly from the engine 10 for estimating an unburned fuel amount or a temperature of the DPF 17, and compensating means for compensating an operating condition difference amount between the required engine operating condition and an actual engine operating condition. Thereby, even if there occur various operating condition differences including the aforementioned injection quantity difference, the difference amount is to be compensated for, making it possible to estimate the unburned fuel amount of the engine with higher precision.

(2) A temperature of the exhaust gas emitted directly from the engine 10 is detected by the exhaust gas temperature sensor 17b, and as the exhaust gas temperature becomes higher, the compensation in the direction of reducing an estimation value of the unburned fuel amount (basic engine unburned fuel amount BUFA) is performed (refer to FIG. 5). Thereby, it is possible to accurately and quickly obtain the actual engine operating condition, finally the operating condition difference amount.

(3) In addition, since such an exhaust gas sensor is also used for a general automobile, the above structure is highly practical.

(4) The present embodiment is structured to be provided with a program for obtaining a basic value of an engine exhaust gas temperature (combustion energy equivalent value) in accordance with the then-required engine operating condition by referring to a certain map (FIG. 4) and a program for calculating the operating condition difference amount as a difference amount between a basic engine exhaust gas temperature BEGT and an actual engine exhaust gas temperature (actual value of the combustion energy equivalent value) detected by the exhaust gas temperature sensor 17b. This structure is to be realized by the existing microcomputer, thereby achieving low costs and downsizing.

(5) The present embodiment is structured to have a program for estimating a temperature of the DPF 17 based upon the unburned fuel amount estimation value compensated at step S14 in FIG. 3. This allows highly accurate estimation of a temperature of the DPF 17. In addition, even in the structure of estimating the DPF temperature by the process shown in FIG. 6, the same advantage or the similar advantage can be obtained.

(6) The present embodiment is structured in such a manner that a required engine operating condition includes a required torque value and an engine rotational speed. This allows an accurate estimation of an unburned fuel amount of the engine or a temperature of the DPF 17.

Second Embodiment

Next, an unburned fuel amount-estimating device for an engine and a temperature-estimating device of an exhaust emission purifier in a second embodiment of the present invention will be explained with reference to accompanying drawings. It should be noted that each device in the present embodiment is also applied to the vehicle control system shown in FIG. 1, for example. In addition, the structure of the system is basically the same as one explained in the first embodiment and here, the explanation of the structure of the system is omitted. Hereinafter, points of each device (particularly an unburned fuel amount estimating device of an engine) of the present embodiment different from the first embodiment will be mainly explained.

Even the present embodiment is adapted to detect a magnitude of energy (combustion energy) generated by fuel combustion in the engine 10 to compensate for the aforementioned operating condition difference amount (deviation between a required engine operating condition and an actual engine operating condition) based upon the detection value. This is the same as the first embodiment. However, the present embodiment uses a plurality (two) of parameters as combustion energy equivalent values for detecting a magnitude of the combustion energy, further enhancing estimation precision on the unburned fuel amount. More specifically, a torque value (exactly, not a torque value itself, but a torque equivalent value indirectly showing the torque value) generated by fuel combustion in the engine 10 is detected. The in-cylinder pressure sensor 20a detects an in-cylinder pressure at fuel combustion in the engine 10 and this detection value is to be used as a combustion energy equivalent value with the engine exhaust gas temperature. Hereinafter, by referring to FIGS. 7 to 9 with FIG. 1, this estimation mode will be in more detail explained.

Figure 7:
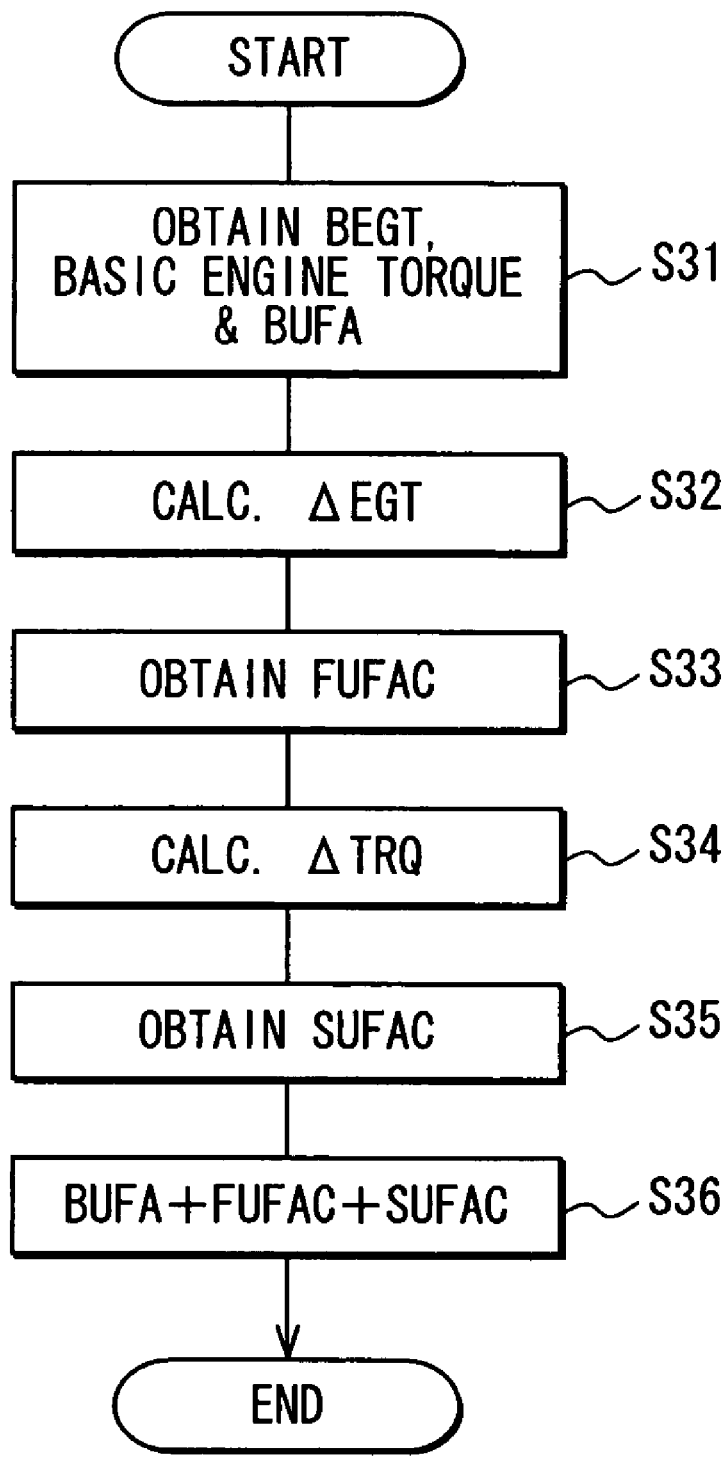
FIG. 7 is a flowchart showing a process in regard to an estimation of an unburned fuel amount executed by an unburned fuel amount-estimating device and a temperature-estimating device of an exhaust emission purifier in a second embodiment of the present invention.

FIG. 7 is a flowchart showing the process in regard to estimation of an unburned fuel amount executed by the ECU 50 in the present embodiment. It should be noted that a series of processes in FIG. 7 also are basically executed at each predetermined crank angle or a predetermined time cycle sequentially in regard to each cylinder 20 of the engine 10 at least at regeneration processing of the DPF 17 by performing programs stored in the ROM by the ECU 50. Values of various parameters used in the process in FIG. 7 are stored in a memory device such as a RAM or an EEPROM mounted in the ECU 50 as needed and are updated when necessary.

Figure 8:
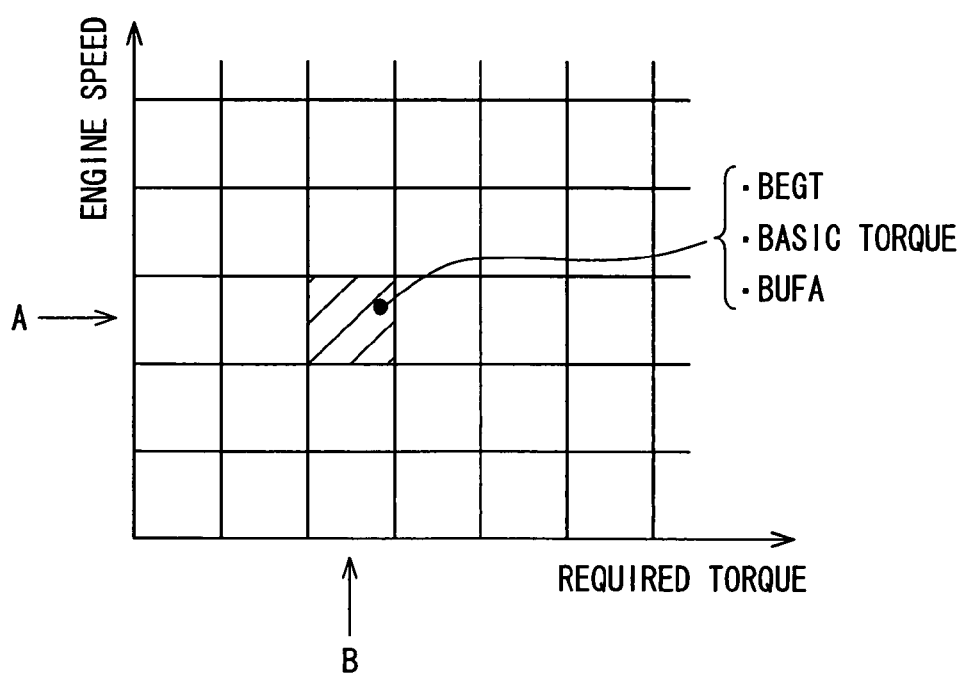
FIG. 8 is a map used upon obtaining a basic value in the second embodiment.

As shown in FIG. 7, in the series of the processes, first at step S31, for example, by referring to a certain second dimensional map as shown in FIG. 8 (for example, similar to the map exemplified in FIG. 4), a predetermined basic engine exhaust gas temperature BEGT, a basic engine torque value and a basic engine unburned fuel amount BUFA (equivalent to of an estimation value of an unburned fuel amount) in accordance with a required engine operating condition at this point are obtained as basic values before correction.

Figure 9A:
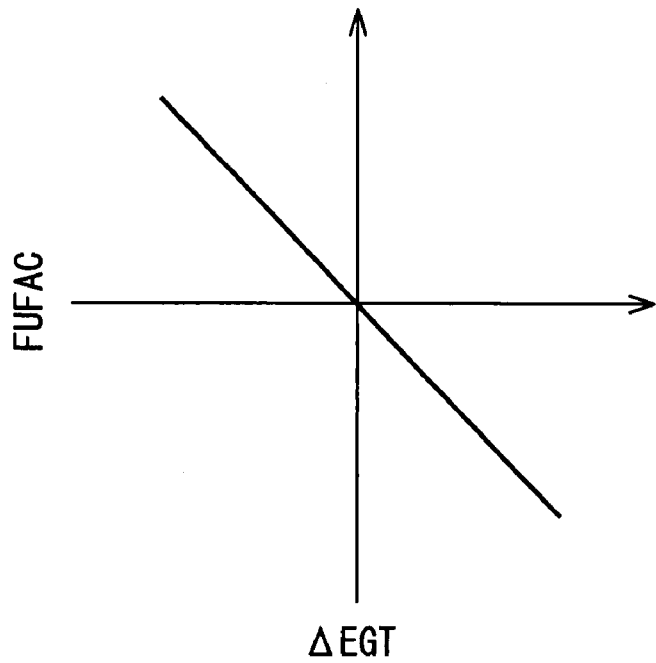
FIGS. 9A and 9B are maps for obtaining a correction value in the second embodiment.

Next, the present embodiment obtains a first engine unburned fuel amount correction value FUFAC as a correction value for compensate for an operating condition difference amount through processes at steps S32 and S33 corresponding to steps S12 and S13 in FIG. 3. FIG. 9A is one example of a map used for obtaining the correction value and basically shows the same correlation as in the map exemplified in FIG. 5. However, depending on a relation between the first engine unburned fuel amount correction value FUFAC and a second engine unburned fuel amount correction value SUFAC (correction value by a torque equivalent value) to be determined at a later step, there is a case where by setting weighting between both the correction values (ratio of correction values) to adjust a magnitude of the correction value by each combustion energy equivalent value, the estimation precision improves. In this case, it is preferable to perform the compensation with a map different from the map (refer to FIG. 5) used in the compensation by one combustion energy equivalent value only.

Figure 9B:
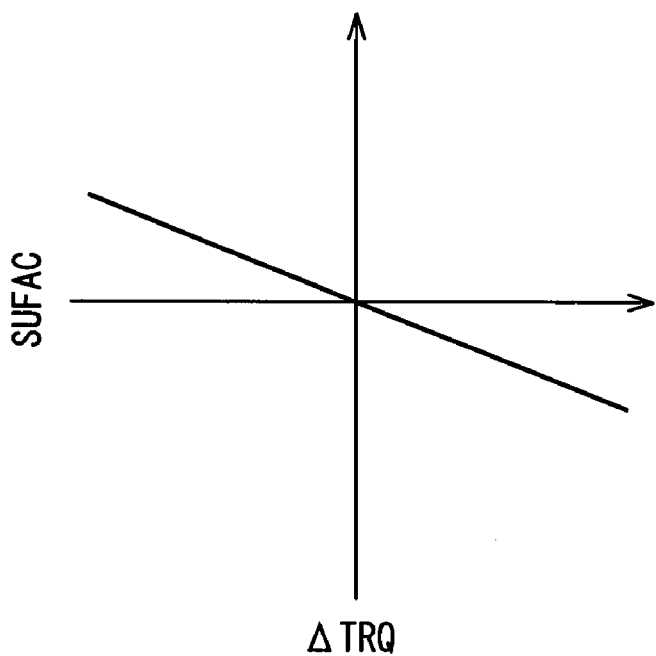

Next, at step S34, a differential torque ΔTRQ between an in-cylinder pressure (actual engine torque value) at fuel combustion in the engine 10 detected by the in-cylinder pressure sensor 20a and the basic engine torque value obtained at step S31 (=actual engine torque value−basic engine torque value) is calculated. At next step S35, a second engine unburned fuel amount correction value SUFAC is obtained based upon this differential torque ΔTRQ and for example, a certain map. This correction value is used for compensating for an estimation error (operating condition difference amount) of an unburned fuel amount due to the deviation of the aforementioned operating condition in regard to the basic engine unburned fuel amount BUFA. FIG. 9B shows one example of a map used for obtaining this correction value.

As shown in FIG. 9B, this map is a one-dimensional map in which a first engine unburned fuel amount correction value FUFAC is defined by the differential torque ΔTRQ uniquely, and is made by in advance obtaining an associated relation between the first engine unburned fuel amount correction value FUFAC and the differential torque ΔTRQ by experiments or the like, for example. In detail, according to a relation between the combustion energy (combustion amount) shown in FIG. 15 and the unburned fuel amount, as the combustion energy (exactly, differential torque ΔTRQ which is one of combustion energy equivalent values) becomes greater, a correction value for increasing a correction amount to the unburned fuel amount estimation value obtained at former step S31 in a minus side (in the direction of reduction) is to be obtained.

The first and second engine unburned fuel amount correction values are thus obtained and at next step S36, for example, calculation of "basic engine unburned fuel amount BUFA+the first engine unburned fuel amount correction value FUFAC and the second engine unburned fuel amount correction value SUFAC" is made by these correction values. This calculation compensates for the operating condition difference amount of the basic engine unburned fuel amount BUFA obtained at step S31. In consequence, the unburned fuel amount of the engine 10 is to be estimated with higher precision.

According to the present embodiment described in detail, in addition to the same advantages as or the advantages corresponding to the advantages of the above-mentioned (1) to (6), the following excellent advantages can be obtained.

(7) By using two combustion energy equivalent values, it is possible to estimate the unburned fuel amount (mainly HC content) of the engine and the DPF temperature with higher precision.

Third Embodiment

Next, an unburned fuel amount-estimating device for an engine and a temperature-estimating device of an exhaust emission purifier in a third embodiment of the present invention will be explained with reference to accompanying drawings. It should be noted that each device in the present embodiment is also applied to the vehicle control system shown in FIG. 1, for example. In addition, the structure of the system is basically the same as one explained in the first embodiment and here, the explanation of the structure of the system is omitted. Hereinafter, points of each device (particularly an unburned fuel amount estimating device of an engine) of the present embodiment different from the second embodiment will be mainly explained.

Even the present embodiment is adapted to detect a magnitude of energy (combustion energy) generated by fuel combustion in the engine 10 to compensate for the aforementioned operating condition difference amount (deviation between a required engine operating condition and an actual engine operating condition) based upon the detection value. This is the same as the first and second embodiments. However, the present embodiment correlates a correction value obtained at compensation (equivalent to an operating condition difference amount) to the then-required engine operating condition to store this correction value in a certain memory device (for example, EEPROM). After that, in a case where a required engine operating condition at some timing corresponds to the above required engine operating condition, the correction value previously obtained is read out from the memory device for use. In consequence, the present embodiment can reduce a calculation load for calculating the correction value (operating condition difference amount) and also quickly obtain the correction value for compensation. Hereinafter, by referring mainly to FIG. 10 with FIG. 1, this estimation mode will be in more detail explained.

Figure 10:
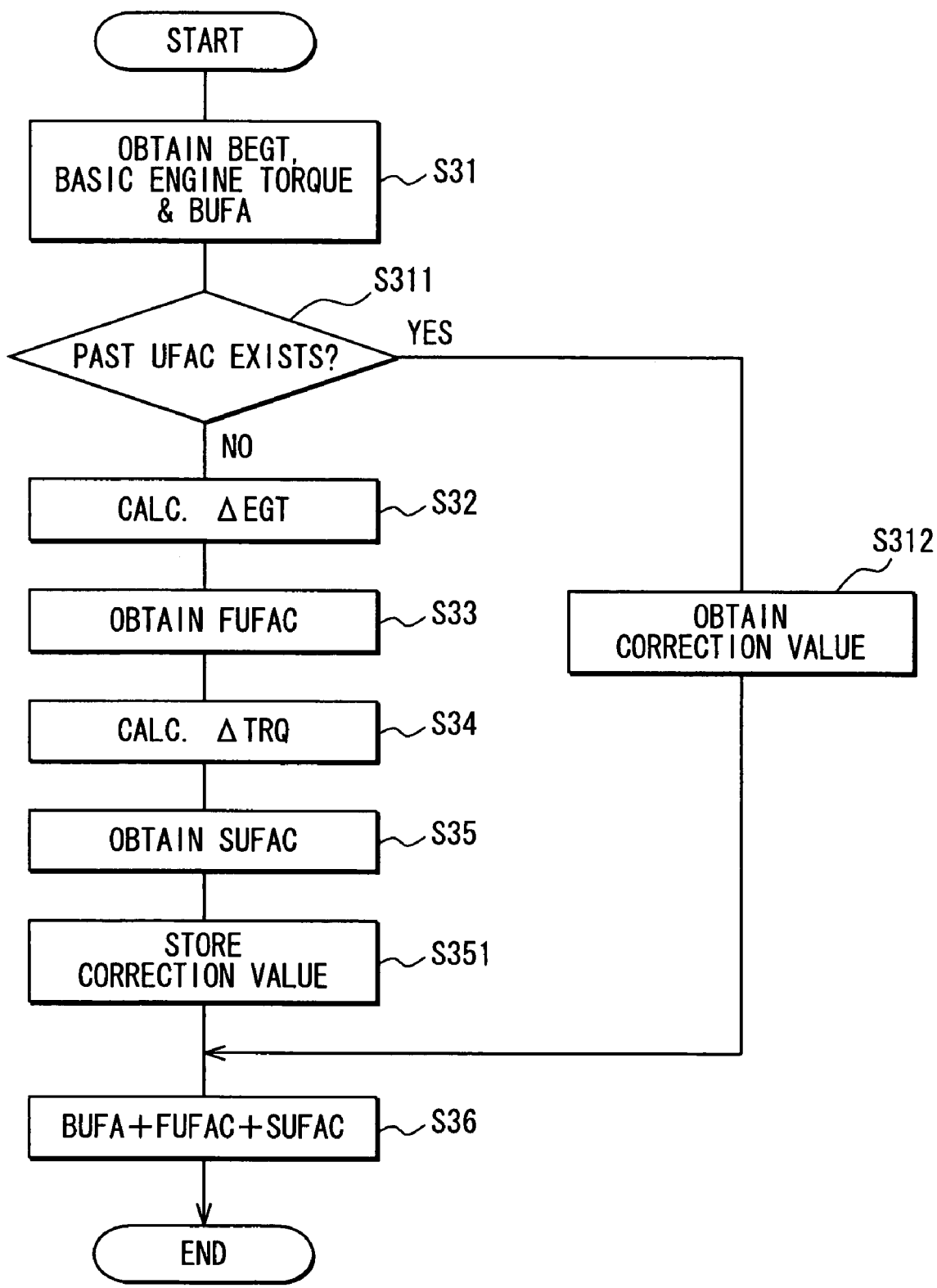
FIG. 10 is a flowchart showing a process in regard to an estimation of an unburned fuel amount executed by an unburned fuel amount-estimating device and a temperature-estimating device of an exhaust emission purifier in a third embodiment of the present invention.

FIG. 10 is a flowchart showing the process order in regard to estimation of an unburned fuel amount executed in the ECU 50 in the present embodiment. Since the processes at steps S31 to 36 in FIG. 10 are similar to those at steps S31 to 36 in FIG. 7, here a detailed explanation of the process content is omitted. It should be noted that a series of processes in FIG. 10 also are basically executed at each predetermined crank angle or a predetermined time cycle as needed in regard to each cylinder 20 of the engine 10 at least at regeneration processing of the DPF 17 by performing programs stored in the ROM by the ECU 50. Although this process is the same as in FIG. 7, values of various parameters used in the process in FIG. 10 also are stored in a memory device such as a RAM or an EEPROM mounted in the ECU 50 as needed and are updated when necessary.

Figure 11:
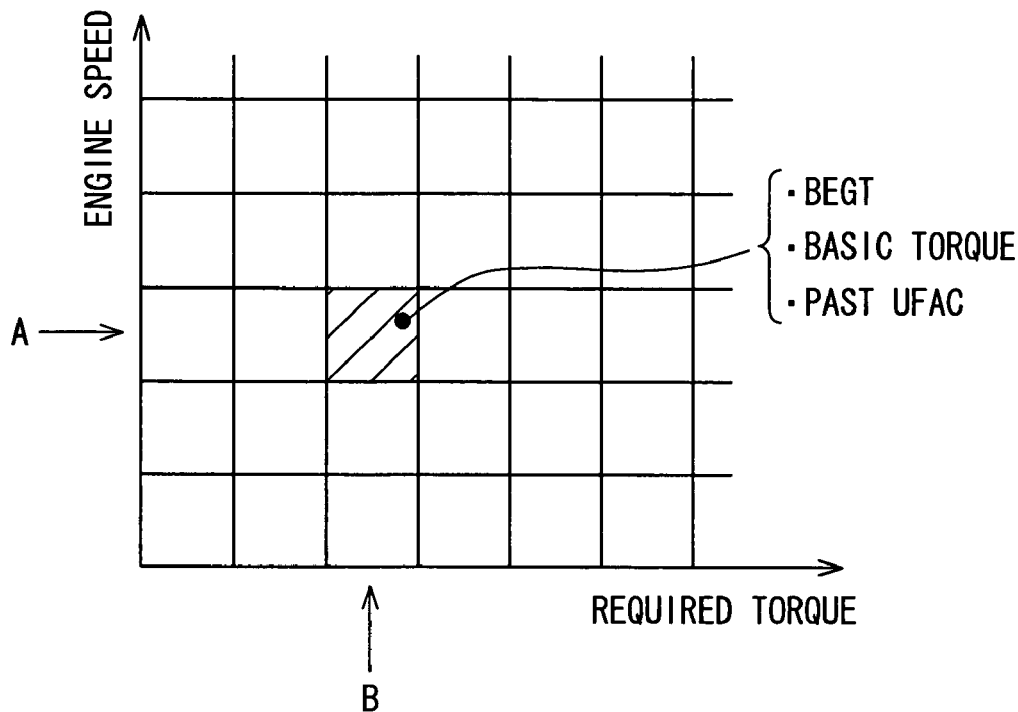
FIG. 11 is a map for correlating a required engine operating condition automatically composed, with a correction value used for compensation in the past in the third embodiment.

As shown in FIG. 10, in the series of the processes, at step S311, for the duration when it is determined that the correction value corresponding to the then-required engine operating condition is not stored in a certain memory device (for example, EEPROM) (equivalent to "NO" in FIG. 10), like the second embodiment, an estimation error (operating condition difference amount) of an unburned fuel amount is to be compensated by the processes at steps S31 to 36. However, the device in the present embodiment correlates the first and second engine unburned fuel amount correction values (equivalent to the operating condition difference amount) calculated at steps S33 and S35 at this point with the then-required operating condition at step S351 immediately after step S35, which are respectively stored in the certain memory device. In consequence, by repetition of the processes at steps S31 to S36 and S351, for example as shown in FIG. 11, a map for correlating the required engine operating condition (required torque value and engine rotational speed) with the correction value used in the compensation in the past (the past engine unburned fuel amount correction value) is to be automatically composed in the memory device (a case of adding this correction value to a map used at step S31 is exemplified in FIG. 11).

On the other hand, at step S311, in a case where the correction value corresponding (correlated) to the then-required engine operating condition is determined to exist in the correction values stored at step S351, that is in the engine unburned fuel amount correction values obtained in the past compensation (equivalent to "YES" in the figure), the process goes to step S312, wherein these correction values are read out from the memory device and at subsequent step S36, these correction values are used to compensate for an estimation error of the unburned fuel amount.

In the present embodiment, in a case where it is thus determined at step S311 that the correction value calculated in the past exists, the processes relating to the correction value calculation, that is, the processes at steps S32 to S35 are eliminated. This allows reduction of the calculation load and also quick production of the correction value for compensation.

According to the present embodiment described in detail, in addition to the same advantages as or the advantages corresponding to the advantages of the above-mentioned (1) to (7), the following excellent advantages can be obtained.

(8) The present embodiment is structured to be provided with a program (unburned fuel amount estimation value storing means, step S351) for correlating the correction value (equivalent to the operating condition difference amount) used for compensation in the past with the then-required engine operating condition, which is stored in a certain memory device, and a program (steps S311 and S312) where in a case where a required engine operating condition at some timing corresponds to the above required engine operating condition, the correction value is read out from the memory device. As a result, without in advance obtaining a map by experiments or the like, that is, even after the device shipment, it is possible to automatically and easily produce the map (refer to FIG. 11) for correlating the required engine operating condition with the correction value used in the past. Owing to such map, it is not required to newly obtain the correction value. That is, this allows reduction of the calculation load.

Figure 12:
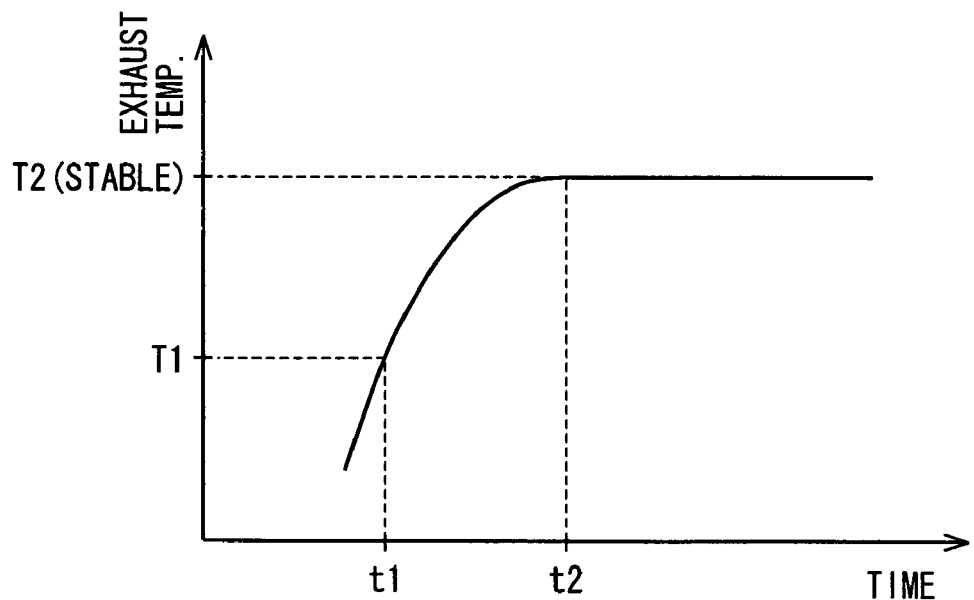
FIG. 12 is a graph showing one example of a combustion energy detection characteristic.

(9) In general, in a transient period when an engine operation is unstable, such as immediately after start of DPF regeneration processing, for example, as shown in FIG. 12, time (timing t2) until a detection value of the exhaust gas temperature sensor becomes stable becomes longer, so that correction accuracy of an unburned fuel amount deteriorates in a case of using an engine exhaust gas temperature as a combustion energy equivalent value. In this respect, according to this structure, in the engine operating region where the correction value has been obtained in the past, the stand-by time for stability is not required due to the correction value used in the past. Therefore, even in a transient period when the engine operation is unstable, the simultaneousness is high, allowing the correction with high precision.

Figure 13:
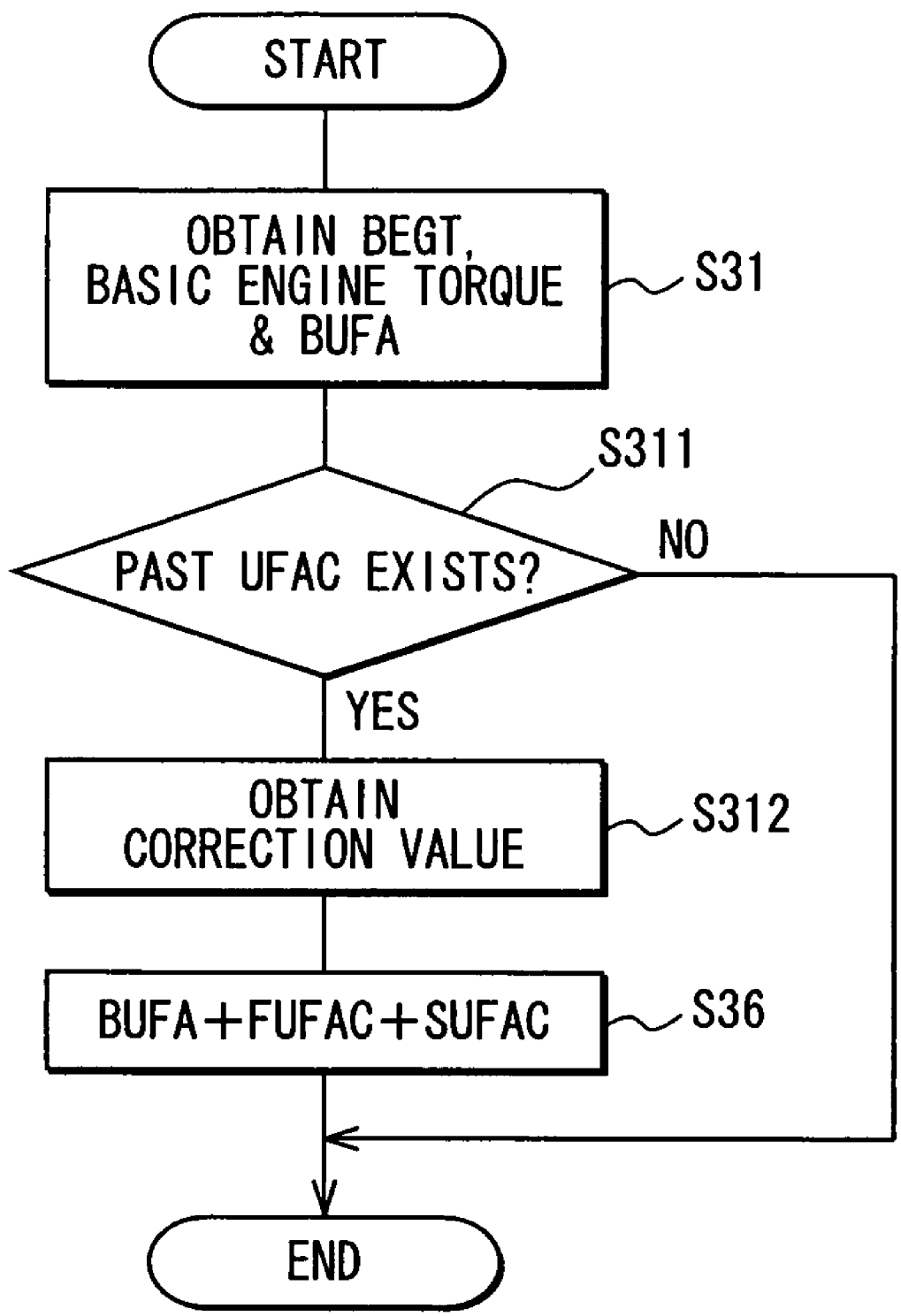
FIG. 13 is a flowchart showing a modification of an unburned fuel amount estimating mode.

It should be noted that the advantage corresponding to the above mentioned (9) can be obtained by an embodiment as follows. That is, a series of the processes shown in FIG. 7 are sequentially executed at each certain crank angle or at a predetermined time cycle, and on this occasion, correction values (first and second engine unburned fuel amount correction values) for each time calculated at the same process are correlated with the then-required engine operating condition, which are stored in a certain memory device as needed (in a case where the correction value already exists, the correction value is updated). Further, in a case where even a series of the processes shown in FIG. 13 are sequentially executed in parallel at each certain crank angle or at a predetermined time cycle, like the above structure, the simultaneousness is high and it is possible to perform the correction with high precision. Hereinafter, this structure will be further explained mainly with reference to FIGS. 7 and 13. It should be noted that each process at steps S31, S311, S312 and S36 is similar to those at steps having the identical numbers in FIG. 10.

That is, as shown in FIG. 13, in a series of processes also, like the processes in FIG. 10, in a case where the correction value corresponding to the then-required engine operating condition exists in the certain memory device based upon the required engine operating condition for each time, the correction value (equivalent to the operating condition difference amount) used for compensation in the past is used to compensate for the unburned fuel amount estimation value. However, at this point since a series of processes shown in FIG. 7 also are executed in parallel to the processes in FIG. 13 and each correction value is stored for each time in the memory device (for example, a map as shown in FIG. 11 is updated for each time), the correction value in the memory device (on the map) is to be updated to the latest value in accordance with a state of the engine control system at this point. In consequence, with this structure, the advantage corresponding to the above-mentioned (9) can be obtained and also even in a case where the state of the engine control system changes due to aging or the like (for example, degradation of an actuator or the like), the correction value (learned value) updated in accordance with the then-engine control system state is used, thereby making it possible to estimate the unburned fuel amount with high precision.

Fourth Embodiment

Next, an unburned fuel amount-estimating device for an engine and a temperature-estimating device of an exhaust emission purifier in a fourth embodiment of the present invention will be explained with reference to accompanying drawings. It should be noted that each device in the present embodiment is also applied to the vehicle control system shown in FIG. 1, for example. In addition, the structure of the system is basically the same as one explained in the first embodiment and here, the explanation of the structure of the system is omitted.

In the present embodiment, there will be explained a structure where a program relating to regeneration processing of the DPF 17 (refer to FIG. 1) is added to any device in the first to third embodiments. More specially a device in the present embodiment is provided with a program for determining degrees of performance degradation in the engine control system based upon an unburned fuel amount estimation value after estimation error (operating condition difference amount) compensation and a program for stopping regeneration processing of the DPF 17 in a case where it is determined that the degree of performance degradation in the engine control system during regeneration processing of the DPF 17 is greater than an allowance level. Hereinafter, this structure will be further explained by referring mainly to FIG. 14 with FIG. 1.

Figure 14:
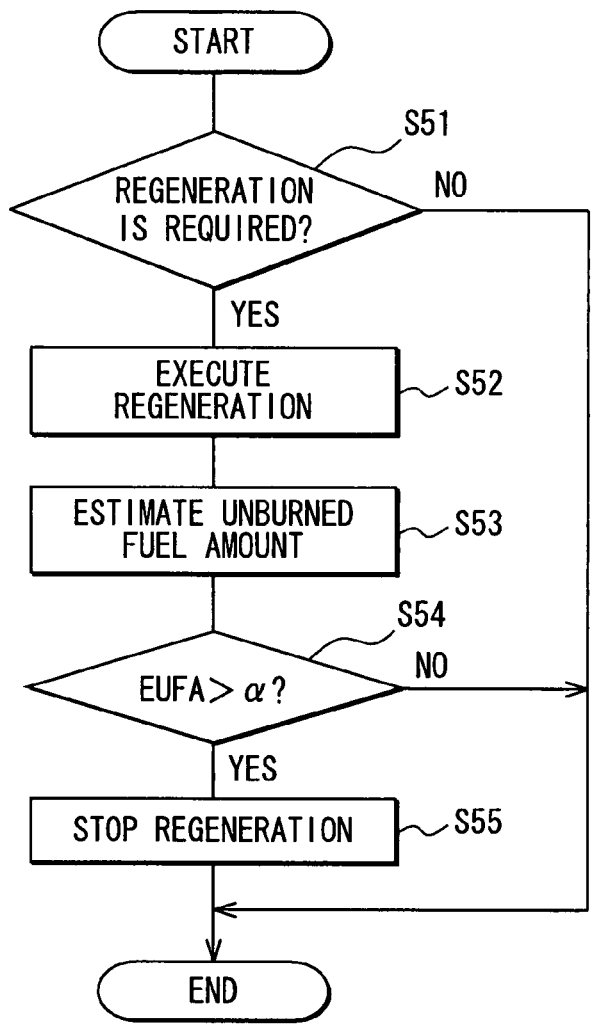
FIG. 14 is a flowchart showing a process in regard to a performance degradation determination of an engine control system and a failsafe processing based upon the determination executed by an unburned fuel amount-estimating device and a temperature-estimating device of an exhaust emission purifier in a fourth embodiment of the present invention.

FIG. 14 is a flowchart showing a process in regard to performance degradation determination of an engine control system and a failsafe process based upon the determination which are executed by the ECU 50 in the present embodiment. It should be noted that a series of processes in FIG. 14 also are basically executed at each predetermined crank angle or a predetermined time cycle sequentially in regard to each cylinder 20 of the engine 10 at least at regeneration processing of the DPF 17 by performing programs stored in the ROM by the ECU 50. Values of various parameters used in the process in FIG. 14 also are stored in a memory device such as a RAM or an EEPROM mounted in the ECU 50 as needed and are updated when necessary.

As shown in FIG. 14, in a series of these processes, at step S51, it is determined whether or not regeneration of the DPF 17 is required, that is, whether or not an execution condition or a continuing condition of the DPF regeneration is satisfied. For example, it is determined whether or not a PM trap amount of the DPF 17 is more than a threshold value or whether or not a predetermined time has elapsed after the previous regeneration execution.

Further, in a case where it is determined at step S51 that the above condition is not satisfied (regeneration of the DPF is not necessary), a series of the processes end and on the other hand, in a case where it is determined at step S51 that the above condition is satisfied (regeneration of the DPF is necessary), at subsequent step S52, for example, regeneration processing of the DPF 17 is executed or continued in a mode shown in FIG. 2.

During the executing of DPF regeneration processing, at step S53 subsequent to step S52, for example, an engine unburned fuel amount (an estimation value of the unburned fuel amount) in which an estimation error (operating condition difference amount) is compensated through the process shown in any of FIGS. 3, 7, 10 and 13 is obtained.

In addition, next at subsequent step S54, the engine unburned fuel amount is compared with the threshold value, in detail it is determined whether or not a relational expression of "engine unburned fuel amount EUFA>threshold value α" is satisfied. Thereby, the degree of performance degradation of the engine control system is determined based upon the magnitude of the engine unburned fuel amount.

In a case where it is determined at step S54 that the relational expression is not satisfied, it is determined that the degree of the performance degradation in the engine control system is small and a series of the processes ends to continue the DPF regeneration as it is. On the other hand, in a case where it is determined at step S54 that the relational expression is satisfied, it is determined that the degree of the performance degradation in the engine control system is large and the process goes to step S55, wherein the DPF regeneration processing as the process at step S55 is stopped.

It should be noted that the threshold value used for determination at step S54 may be a fixed value or a variable value. For example, if this threshold value changes with a temperature of the DPF 17 (as the DPF temperature is higher, the threshold value becomes smaller), soluble damages of the DPF 17 can be more securely prevented.

According to the present embodiment described in detail, in addition to the same advantages as or the advantages corresponding to the advantages of the above-mentioned (1) to (9), the following excellent advantages can be obtained.

(10) The present embodiment is provided with a program (step S54) for determining degrees of performance degradation in the engine control system based upon an estimation error of the unburned fuel amount after the estimation error (operating condition difference amount) is compensated and a program (step S55) for stopping regeneration processing of the DPF 17 in a case where it is determined that the degree of performance degradation in the engine control system is greater than an allowance level. Thereby, soluble damages or the like of the DPF 17 can be prevented.

Other Embodiment

In the fourth embodiment, a failsafe processing in a case where it is determined that the degree of performance degradation in the engine control system is large is not limited to an application to the stop of the DPF regeneration processing, but it is possible to improve a security level by letting a driver be informed of the degree of the performance degradation by the writing-in of diagramming codes or a report device such as a warning lamp. In this sense, timing of determining the degree of the performance degradation of the engine control system is not limited to the duration of the DPF regeneration processing, but for example, it is also advantageous to perform such determination at each predetermined crank angle or in a predetermined time cycle.

Not only in the first embodiment, but also in the second to fourth embodiments and the modifications, a temperature of the DPF 17 can be estimated in a mode corresponding to the processing in FIG. 6 based upon an unburned fuel amount estimation value in which an estimation error (operating condition difference amount) is compensated.

As for a catalyst disposed in the filter (for example, DPF 17), the present invention can be in principle applied to any catalyst which reacts in the form of making a heat change With unburned fuel (for example, HC) and a catalyst other than an oxidized catalyst may be used in place of the oxidized catalyst, depending on an application thereof or a constituent of the unburned fuel.

In addition, the disposition mode of the catalyst is not limited by the carrier and a temperature of a filter with a catalyst equipped with a catalyst disposed in the pre-stage can be detected by the mode similar to that in each embodiment.

Each of the embodiments described above refers to a case of estimating a heat generation amount in a catalyst based upon an estimation value of the unburned fuel amount to detect a temperature of the filter, but the present invention may be applied to a case of detecting a temperature of a catalyst itself based upon an estimation value of the unburned fuel amount.

Particularly in a case of using a NOx absorption catalyst or the like (reduction catalyst) for promoting a reduction reaction so as to dissolve the NOx in the exhaust gas into nitrogen and oxygen, it is advantageous to mount a program together with the aforementioned program for estimating an unburned fuel amount as an additive amount of a reduction agent to the NOx absorption catalyst based upon an estimation value of the unburned fuel amount where an estimation error (operating condition difference amount) is compensated through the process shown in any in FIGS. 3, 7, 10 and 13, on the ECU 50 (refer to FIG. 1). With this structure, the unburned fuel amount as the reduction agent additive amount can be estimated with high precision.

Each embodiment describe above has explained the case of estimating the unburned fuel amount in the exhaust gas emitted from each engine, but it may be possible to estimate the unburned fuel amount for each cylinder in the same engine. For example, in the engine 10 in FIG. 1, in a case of compensating for an estimation error (operating condition difference amount) with a detection value of the in-cylinder pressure sensor 20a disposed in each of the cylinders 20, the unburned fuel amount for each cylinder can be estimated from a torque equivalent value in each cylinder. Further, even in a case of performing compensation with an exhaust gas temperature, when an exhaust gas temperature sensor is disposed to an exhaust pipe (branch passage) of each cylinder 20 before the merging of the exhaust pipe 12, it is possible to estimate the unburned fuel amount for each cylinder from an exhaust gas temperature in each cylinder.

Each of the embodiments describe above has referred to a case of using the existing sensor or the like used for another application by assuming the existing vehicular structure, but a new different sensor may be disposed for the present invention. In addition, any value for indicating a magnitude of energy generated by fuel combustion in an engine may be used as a combustion energy equivalent value. That is, the combustion energy equivalent value is not limited to the engine exhaust gas temperature (a temperature of an exhaust gas emitted directly from an engine) or an in-cylinder pressure at fuel combustion in an engine, but may use an arbitrary parameter of the above value. For example, in a case of disposing a sensor to a distribution pipe to measure a temperature of the exhaust pipe as a combustion energy equivalent value or in a case of measuring torque of the crank shaft as a combustion energy equivalent value (particularly, a torque equivalent value) directly by any torque sensor or the like, the advantage corresponding to the above-mentioned (1) can be obtained.

In a case of -compensating for an estimation error (operating condition difference amount) only with a detection value of the in-cylinder pressure sensor 20a, the present invention can be basically carried out by a mode corresponding to the first embodiment. In addition, even in a case of using three combustion energy equivalent values or more, the present invention can be basically carried out by a mode corresponding to the second embodiment.

The calculation content (process content of step S14 in FIG. 3 or the like) relating to the kind or the correction of the correction value can be arbitrarily made. For example, calculations of four operations (addition, subtraction, multiplication and division) or calculations of differential and integral may be arbitrarily combined to perform a more accurate correction.

Each of the embodiments described above uses various software (programs), but may use hardware such as exclusive circuits to realize the same functions.

Each of the embodiments described above has referred to a case where the present invention is applied to a common rail system of a vehicular diesel engine, but likewise, may be basically applied to a spark ignition type of gasoline engine (particularly in-direct injection engine). For example, the aforementioned NOx absorption catalyst is put into practice in a gasoline engine or the like.

Use fuel is not limited to diesel oil or a gasoline (both are liquid fuel) and the present invention may be applied to an engine of adopting various fuel including gas fuel such as a natural gas.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. An unburned fuel amount component-estimating device in an engine, estimating an unburned fuel amount emitted from an engine after fuel combustion based upon a basic engine exhaust gas temperature as a control target value in an engine control system for controlling an engine operating condition based upon the basic engine exhaust gas temperature, comprising:
   a predetermined map comprising a required torque value and engine rotation speed for defining a basic engine exhaust gas temperature and basic engine unburned fuel amount;
   a detector which detects exhaust gas temperature indicating a magnitude of energy generated by the fuel combustion in the engine;
   a unit which determines an operating condition difference among the basic engine exhaust gas temperature and actual engine exhaust gas temperature;
   a unit which obtains an engine unburned fuel amount correction value based upon the differential exhaust gas temperature and said predetermined map;
   a compensating unit configured to compensates for said operating condition difference amount for an unburned fuel amount due to the deviation of said basic engine unburned fuel amount;
   an estimating unit configured to estimate the unburned fuel amount of said engine based on said engine unburned fuel amount correction value and basic engine unburned fuel amount.

2. An unburned fuel amount-estimating device in an engine according to claim 1, wherein
   the detector detects a temperature of an exhaust gas emitted directly from the engine as the detected gas temperature, and
   the compensating unit performs compensation in a direction where as the exhaust gas temperature becomes higher, the estimate of the unburned fuel amount is reduced.

3. An unburned fuel amount-estimating device in an engine according to claim 1, further comprising:
   a detector which detects a torque equivalent value showing a magnitude of torque generated by the fuel combustion in the engine; and
   the compensating unit performs compensation in a direction where as the torque equivalent value becomes greater, the estimate of the unburned fuel amount is reduced.

4. An unburned fuel amount-estimating device in an engine according to claim 3, wherein:

the torque equivalent value includes an in-cylinder pressure at fuel combustion in the engine.

5. An unburned fuel amount-estimating device in an engine according to claim 1, further comprising:
- a basic energy obtaining unit which obtains a basic value of a combustion energy equivalent value in accordance with a required engine operating condition at each time; and
- a condition difference calculation unit which calculates the operating condition difference amount as a differential value between the basic value of the combustion energy equivalent value obtained by the basic energy obtaining unit and an actual detected value of the combustion energy equivalent value.

6. An unburned fuel amount-estimating device in an engine according to claim 1, further comprising:
- a storing unit which stores a value of the estimated unburned fuel amount compensated by the compensating unit or the operating condition difference amount used for the same compensation, correlated with a required engine operating condition, wherein:
- values stored as the value of the estimated unburned fuel amount or the operating condition difference amount in the storing unit are used.

7. An unburned fuel amount-estimating device in an engine according to claim 1, further comprising:
- a degradation determining unit which determines degrees of performance degradation of the engine control system based upon a value of the estimated unburned fuel amount compensated by the compensating unit.

8. An unburned fuel amount-estimating device in an engine according to claim 7, further comprising:
- a filter with a catalyst disposed in an exhaust passage of the engine for trapping PM, where heat processing as regeneration processing is executed for removing the trapped PM; and
- a regeneration processing stopping unit which stops the regeneration processing of the filter in a case that it is determined that the degree of the performance degradation of the engine control system is greater than an allowance level by the degradation determining unit during the regeneration processing of the filter.

9. An unburned fuel amount-estimating device in an engine according to claim 1, further comprising:
- a filter temperature estimating unit which estimates a temperature of the filter based upon a value of the estimated unburned fuel amount compensated by the compensating unit.

10. An unburned fuel amount-estimating device in an engine according to claim 1, further comprising:
- a reduction catalyst for promoting a reduction reaction so as to dissolve NOx in the exhaust gas into nitrogen and oxygen; and
- an additive amount estimating unit which estimates the unburned fuel amount as an additive amount of a reduction agent to the reduction catalyst based upon a value of the estimated unburned fuel amount compensated by the compensating unit.

11. A method of estimating an unburned fuel amount emitted from an engine after fuel combustion based upon a basic engine exhaust gas temperature as a control target value in an engine control system for controlling an engine operating condition based upon the basic engine exhaust gas temperature, the method comprising:
- storing a predetermined map comprising a required torque value and engine rotation speed for defining a basic engine exhaust gas temperature and basic engine unburned fuel amount;
- detecting exhaust gas temperature indicating a magnitude of energy generated by the fuel combustion in the engine;
- determining an operating condition difference among the basic engine exhaust gas temperature and actual engine exhaust gas temperature;
- obtaining an engine unburned fuel amount correction value upon the differential exhaust gas temperature and said predetermined map;
- compensating for an operating condition difference amount for an unburned fuel amount due to the deviation of said basic engine unburned fuel amount; and
- estimating the unburned fuel amount of said engine based on said engine unburned fuel amount correction value and basic engine unburned fuel amount.

12. The method according to claim 11, further comprising:
- detecting a temperature of an exhaust gas emitted directly from the engine as the detected gas temperature, and
- performing compensation in a direction where as the exhaust gas temperature becomes higher, the estimate of the unburned fuel amount is reduced.

13. The method according to claim 11, further comprising:
- detecting a torque equivalent value showing a magnitude of torque generated by the fuel combustion in the engine; and
- performing compensation in a direction where as the torque equivalent value becomes greater, the estimate of the unburned fuel amount is reduced.

14. The method according to claim 11, further comprising:
- obtaining a basic value of a combustion energy equivalent value in accordance with a required engine operating condition at each time; and
- calculating the operating condition difference amount as a differential value between the basic value of the obtained combustion energy equivalent value and an actual value of the detected combustion energy equivalent value.

15. The method according to claim 11, further comprising:
- determining degrees of performance degradation of the engine control system based upon a estimated value of the unburned fuel amount that has been compensated.

16. The method according to claim 11, further comprising:
- promoting, using a reduction catalyst, a reduction reaction so as to dissolve NOx in the exhaust gas into nitrogen and oxygen; and
- estimating the unburned fuel amount as an additive amount of a reduction agent to the reduction catalyst based upon the compensated estimated value of the unburned fuel amount.

* * * * *